(12) United States Patent
Ly et al.

(10) Patent No.: US 11,812,319 B2
(45) Date of Patent: Nov. 7, 2023

(54) PHYSICAL UPLINK SHARED CHANNEL REPETITIONS DURING HANDOVER

(71) Applicant: QUALCOMM Incorporated, San Diego, CA (US)

(72) Inventors: Hung Dinh Ly, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/219,377

(22) Filed: Mar. 31, 2021

(65) Prior Publication Data

US 2022/0322188 A1 Oct. 6, 2022

(51) Int. Cl.
*H04W 4/00* (2018.01)
*H04W 36/18* (2009.01)
*H04W 36/00* (2009.01)
*H04W 36/08* (2009.01)

(52) U.S. Cl.
CPC ....... *H04W 36/18* (2013.01); *H04W 36/0069* (2018.08); *H04W 36/0072* (2013.01); *H04W 36/08* (2013.01)

(58) Field of Classification Search
CPC ......... H04W 36/0055; H04W 36/0061; H04W 36/0069; H04W 36/00692; H04W 36/0072; H04W 36/0077; H04W 36/08; H04W 36/18; H04W 36/185; H04W 36/30; H04W 36/302; H04W 36/304
See application file for complete search history.

(56) References Cited

U.S. PATENT DOCUMENTS

| | | | |
|---|---|---|---|
| 2020/0329405 A1 | 10/2020 | Awoniyi-Oteri et al. | |
| 2021/0168848 A1* | 6/2021 | Chatterjee | H04L 1/1854 |
| 2022/0159683 A1* | 5/2022 | Islam | H04W 72/1268 |

(Continued)

OTHER PUBLICATIONS

3GPP TS 38.213: "3rd Generation Partnership Project, Technical Specification Group Radio Access Network, NR, Physical Layer Procedures For control (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, pp. 1-183, XP052000308.

(Continued)

*Primary Examiner* — Matthew W Genack
(74) *Attorney, Agent, or Firm* — Harrity & Harrity, LLP

(57) ABSTRACT

Various aspects of the present disclosure generally relate to wireless communication. In some aspects, a user equipment (UE) may transmit, to a source base station associated with a source master cell group (MCG), a physical uplink shared channel (PUSCH) repetition in one or more slots of the source MCG during a handover of the UE from the source MCG to a target MCG. The UE may perform, to a target base station associated with the target MCG, an uplink transmission in one or more slots to the target MCG during the handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions. Numerous other aspects are described.

30 Claims, 14 Drawing Sheets

(56) References Cited

U.S. PATENT DOCUMENTS

2022/0191940 A1* 6/2022 MolavianJazi ...... H04B 17/318

OTHER PUBLICATIONS

3GPP TS 38.214: "3rd Generation Partnership Project, Technical Specification Group Radio Access Network, NR, Physical layer procedures for data (Release 16)", 3GPP Standard, Technical Specification, 3rd Generation Partnership Project, Mobile Competence Centre, 650, Route Des Lucioles, F-06921 Sophia-Antipolis Cedex, France, vol. RAN WG1, No. V16.5.0, Mar. 30, 2021, 171 Pages, XP052000310.

International Search Report and Written Opinion—PCT/US2022/070877—ISA/EPO—dated Jun. 21, 2022.

Moderator (Sharp): "FL Summary on Enhancements on PUSCH Repetition Type A", 3GPP TSG RAN WG1 #104-e, R1-2102113, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Feb. 5, 2021, XP051977702, pp. 1-67.

* cited by examiner

| 0 | 1 | 2 | 3 | 4 | 5 | 6 | 7 | 8 | 9 | 10 | 11 | 12 | 13 | 14 | 15 | 16 | 17 | 18 | 19 | Source MCG |
|---|---|---|---|---|---|---|---|---|---|----|----|----|----|----|----|----|----|----|----|---|
| U | U | U | U | U | U | U | U | U | U | U | U | U | U | U | U | U | U | U | U | |

| Counting option 1 | | | 0 | 1 | 2 | 3 | 4 | 5 | 6 | 7 | 8 | 9 | 10 | 11 | 12 | 13 | 14 | 15 | | Target MCG |
|---|---|---|---|---|---|---|---|---|---|---|---|---|---|---|---|---|---|---|---|---|
| Counting option 2 | | | 0 | 1 | X | X | 2 | 3 | 4 | 5 | 6 | 7 | 8 | 9 | 10 | 11 | 12 | 13 | | |
| | | | U | U | U | U | U | U | U | U | U | U | U | U | U | U | U | U | U | |

- U (dotted) — PUSCH repetition transmission to source MCG
- U (hatched) — UL transmission to target MCG
- U (dark) — PUSCH repetition transmission to source MCG is cancelled

FIG. 7

| 0 | 1 | 2 | 3 | 4 | 5 | 6 | 7 | 8 | 9 | 10 | 11 | 12 | 13 | 14 | 15 | 16 | 17 | 18 | 19 | |
|---|---|---|---|---|---|---|---|---|---|----|----|----|----|----|----|----|----|----|----|---|
| D | D | S | U | D | D | D | S | U | U | D | D | S | U | D | D | D | S | U | U | Source MCG |
| Counting option 1 | | | 0 | | | | | 1 | 2 | | | | 3 | | | | | 4 | 5 | |
| Counting option 2 | | | 0 | | | | | X | X | | | | 1 | | | | | 2 | 3 | |
| U | U | U | U | U | U | U | U | U | U | U | U | U | U | U | U | U | U | U | U | Target MCG |

FIG. 9

| 0 | 1 | 2 | 3 | 4 | 5 | 6 | 7 | 8 | 9 | 10 | 11 | 12 | 13 | 14 | 15 | 16 | 17 | 18 | 19 | Source MCG |
|---|---|---|---|---|---|---|---|---|---|---|---|---|---|---|---|---|---|---|---|---|
| U | U | U | U | U | U | U | U | U | U | U | U | U | U | U | U | U | U | U | U | |
| | | | 0 | 1 | 2 | 3 | 4 | 5 | 6 | 7 | 8 | 9 | 10 | 11 | 12 | 13 | 14 | 15 | | Counting option 1 |
| | | | 0 | 1 | 2 | 3 | 4 | 5 | X | X | 6 | 7 | 8 | 9 | 10 | 11 | 12 | 13 | | Counting option 2 |
| D | S | U | U | D | D | D | U | U | U | D | D | S | U | D | D | D | S | U | U | Target MCG |

■ U  PUSCH repetition transmission to source MCG

▨ U  UL transmission to target MCG

▨ U  PUSCH repetition transmission to source MCG is cancelled

FIG. 10

PHYSICAL UPLINK SHARED CHANNEL REPETITIONS DURING HANDOVER

FIELD OF THE DISCLOSURE

Aspects of the present disclosure generally relate to wireless communication and to techniques and apparatuses for physical uplink shared channel (PUSCH) repetitions during handover.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a UE includes transmitting, to a source base station associated with a source master cell group (MCG), a physical uplink shared channel (PUSCH) repetition in each of one or more slots of the source MCG during a dual active protocol stack (DAPS)-based handover of the UE from the source MCG to a target MCG; and performing, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions.

In some aspects, a method of wireless communication performed by a source base station includes transmitting, to a UE, a configuration associated with a quantity of PUSCH repetitions; and receiving, from the UE, a PUSCH repetition in each of one or more slots of a source MCG associated with the source base station during a DAPS-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions.

In some aspects, a UE for wireless communication includes a memory and one or more processors, operatively coupled to the memory, configured to: transmit, to a source base station associated with a source MCG, a PUSCH repetition in each of one or more slots of the source MCG during a DAPS-based handover of the UE from the source MCG to a target MCG; and perform, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions.

In some aspects, a source base station for wireless communication includes a memory and one or more processors, operatively coupled to the memory, configured to: transmit, to a UE, a configuration associated with a quantity of PUSCH repetitions; and receive, from the UE, a PUSCH repetition in each of one or more slots of a source MCG associated with the source base station during a DAPS-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions.

In some aspects, a non-transitory computer-readable medium storing a set of instructions for wireless communication includes one or more instructions that, when executed by one or more processors of a UE, cause the UE to: transmit, to a source base station associated with a source MCG, a PUSCH repetition in each of one or more slots of the source MCG during a DAPS-based handover of the UE from the source MCG to a target MCG; and perform, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions.

In some aspects, a non-transitory computer-readable medium storing a set of instructions for wireless communication includes one or more instructions that, when executed by one or more processors of a source base station, cause the source base station to: transmit, to a UE, a configuration associated with a quantity of PUSCH repetitions; and receive, from the UE, a PUSCH repetition in each of one or more slots of a source MCG associated with the source base station during a DAPS-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions.

In some aspects, an apparatus for wireless communication includes means for transmitting, to a source base station associated with a source MCG, a PUSCH repetition in each of one or more slots of the source MCG during a DAPS-based handover of the apparatus from the source MCG to a target MCG; and means for performing, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions.

In some aspects, a source apparatus for wireless communication includes means for transmitting, to a UE, a configuration associated with a quantity of PUSCH repetitions; and means for receiving, from the UE, a PUSCH repetition in each of one or more slots of a source MCG associated with the source apparatus during a DAPS-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-10 are diagrams illustrating examples associated with PUSCH repetitions during handover, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
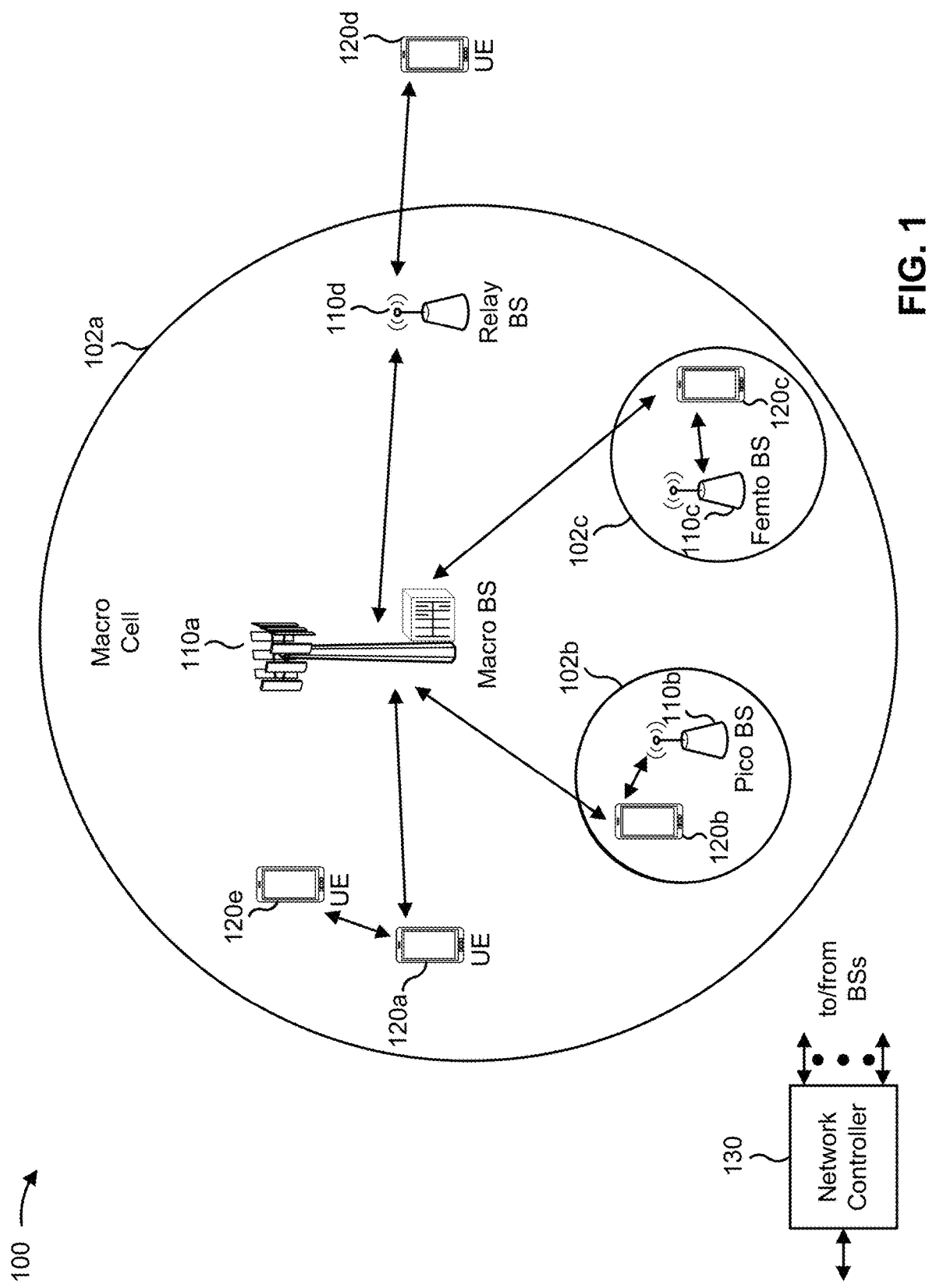
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
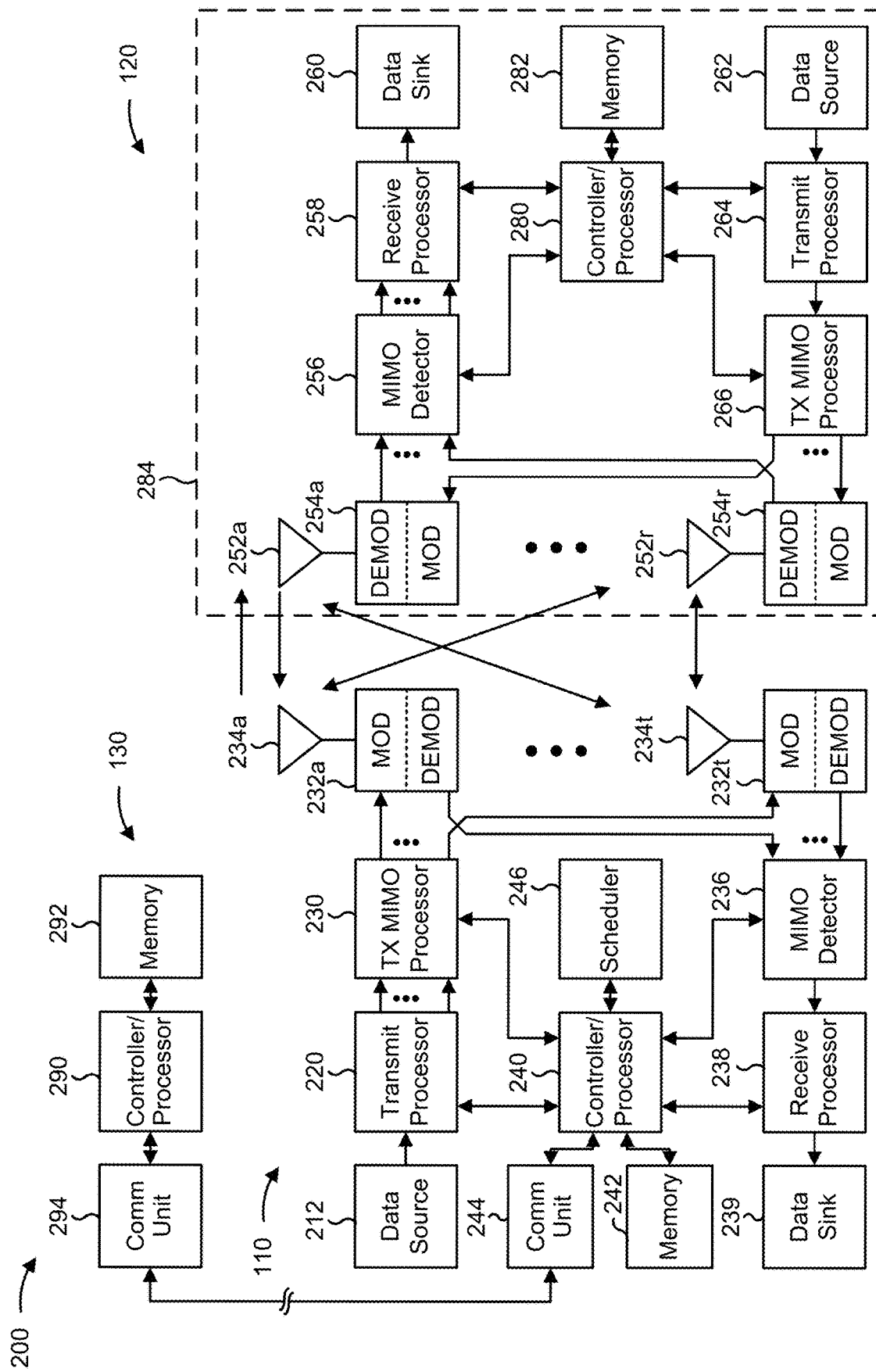
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 6-12).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 6-12).

Controller/processor 240 of base station 110, controller/processor 280 of UE 120, and/or any other component(s) of FIG. 2 may perform one or more techniques associated with PUSCH repetitions during handover, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1100 of FIG. 11, process 1200 of FIG. 12, and/or other processes as described herein. In some aspects, executing instructions may include running the instructions, converting the instructions, compiling the instructions, and/or interpreting the instructions, among other examples.

In some aspects, a UE (e.g., UE 120) includes means for transmitting, to a source base station associated with a source MCG, a PUSCH repetition in each of one or more slots of the source MCG during a DAPS-based handover of the UE from the source MCG to a target MCG; and/or means for performing, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for canceling the PUSCH repetitions associated with the source MCG that overlap in time with the uplink transmission to MCG.

In some aspects, the UE includes means for canceling the PUSCH repetitions associated with the source MCG based at least in part on a lack of UE capability for power sharing between the source MCG and the target MCG during the DAPS-based handover.

In some aspects, the UE includes means for canceling the PUSCH repetitions associated with the source MCG based at least in part on a UE capability of canceling uplink transmissions during the DAPS-based handover.

In some aspects, the UE includes means for canceling the PUSCH repetitions associated with the source MCG based at least in part on an intra-frequency DAPS-based handover.

In some aspects, a source base station (e.g., base station 110*a*) includes means for transmitting, to a UE, a configuration associated with a quantity of PUSCH repetitions; and/or means for receiving, from the UE, a PUSCH repetition in each of one or more slots of a source MCG associated with the source base station during a DAPS-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions. The means for the source base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor

258, and/or the TX MIMO processor 266 may be performed by or under the control of controller/processor 280.

As indicated above, FIG. 2 is provided as an example. Other examples may differ from what is described with regard to FIG. 2.

FR1 and FR2 may be associated with potential bottleneck channels. For example, in FR1, a potential bottleneck channel may be a PUSCH for enhanced mobile broadband (eMBB). The PUSCH for eMBB may be associated with frequency division duplexing (FDD) or time division duplexing (TDD) with a certain slot configuration (e.g., DDDSU, DDDSUDDSUU, or DDDDDDDSUU, where "D" represents a downlink slot, "S" represents a special slot, and "U" represents an uplink slot). In FR1, another potential bottleneck channel may be a PUSCH for Voice over Internet Protocol (VoIP). The PUSCH for VoIP may be associated with FDD or TDD with a certain slot configuration (e.g., DDDSU, or DDDSUDDSUU). In FR2, a potential bottleneck channel may be a PUSCH for eMBB, which may be associated with a certain slot configuration (e.g., DDDSU or DDSU). In FR2, another potential bottleneck channel may be a PUSCH for VoIP with a certain slot configuration (e.g., DDDSU or DDSU).

For PUSCH repetition type A, a UE may repeat a transport block across consecutive slots applying a same symbol allocation in each slot. However, for PUSCH repetition type A, a number of PUSCH repetitions may be based at least in part on a quantity of available uplink/special slots, as counting PUSCH repetitions based at least in part on the consecutive slots may limit a number of actual PUSCH repetitions.

Figure 3:
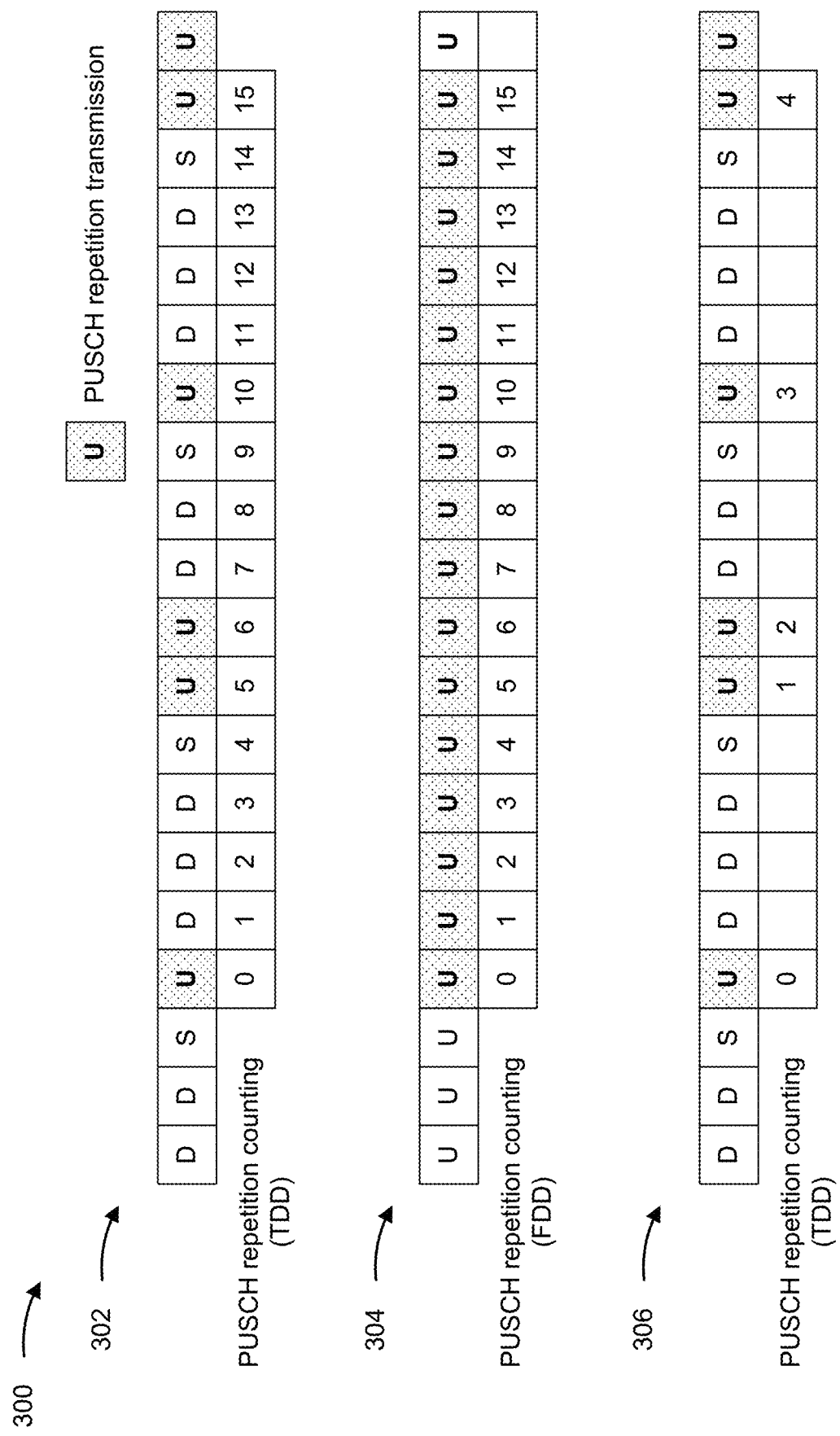
FIG. 3 is a diagram illustrating an example of a PUSCH repetition type A counting, in accordance with the present disclosure.

FIG. 3 is a diagram illustrating an example 300 of a PUSCH repetition type A counting, in accordance with the present disclosure.

As shown by reference number 302, in a PUSCH repetition counting for TDD (unpaired spectrum), a plurality of downlink slots, uplink slots, and/or special slots may be provided based at least in part on a slot configuration. A first PUSCH repetition may be associated with a first slot (an uplink slot or a special slot) and have a count value of 0, and a count value for each subsequent slot (e.g., uplink slot, downlink slot, or special slot) may be incremented by one.

In this example, the first PUSCH repetition associated with the first slot may correspond to the count value of 0, and a second PUSCH repetition associated with a second slot may correspond to a count value of 5, as the first slot and the second slot may be separated by non-uplink slots (e.g., downlink slots). Further, the first slot and the second slot may be associated with a same symbol allocation. For example, when symbols 2-10 are used in the first slot for the first PUSCH repetition, then symbols 2-10 may also be used in the second slot for the second PUSCH repetition.

As shown by reference number 304, in a PUSCH repetition counting for FDD (paired spectrum), a plurality of PUSCH repetitions may occur based at least in part on a slot configuration. A first PUSCH repetition may be associated with a first slot and have a count value of 0, and a count value for each subsequent slot may be incremented by one.

As shown by reference number 306, in a PUSCH repetition counting for TDD (paired spectrum), a plurality of PUSCH repetitions may occur based at least in part on a slot configuration. A first PUSCH repetition may be associated with a first slot and have a count value of 0. In this example, the count value may not increment by one for each consecutive slot, irrespective of whether a next slot is an uplink slot, a downlink slot, or a special slot. Rather, the count value may only be incremented for a subsequent uplink/special slot.

In this example, the first PUSCH repetition associated with the first slot may correspond to the count value of 0, and a second PUSCH repetition associated with a second slot may correspond to a count value of 1, even though the first slot and the second slot may be separated by non-uplink slots (e.g., downlink slots). Thus, in this example, a quantity of PUSCH repetitions may be counted on a basis of available uplink/special slots, and the quantity of PUSCH repetitions may not be counted on a basis of consecutive slots, which may limit a number of actual PUSCH repetitions.

As indicated above, FIG. 3 is provided as an example. Other examples may differ from what is described with regard to FIG. 3.

Figure 4:
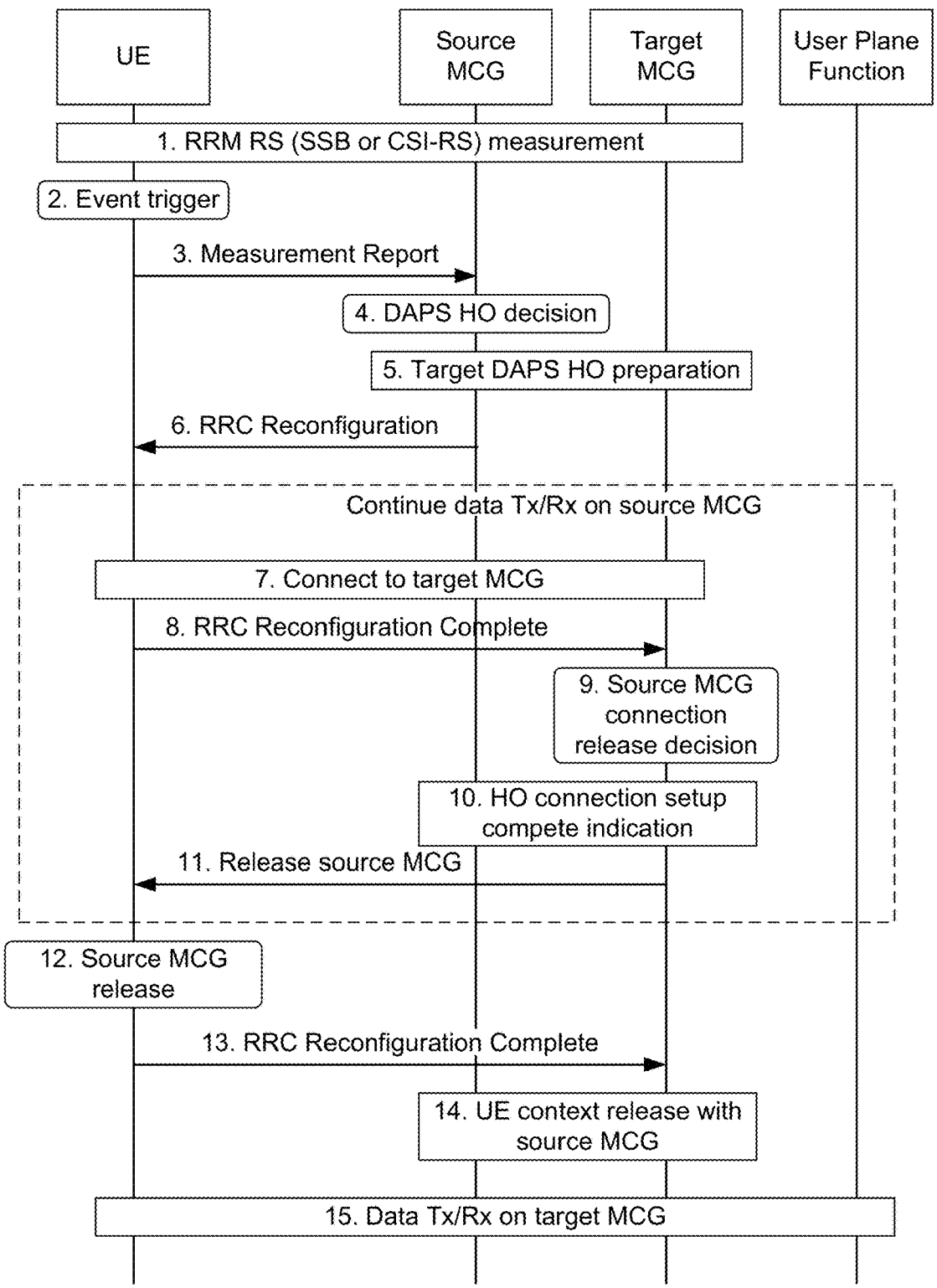
FIG. 4 is a diagram illustrating an example of a DAPS-based handover, in accordance with the present disclosure.

FIG. 4 is a diagram illustrating an example 400 of a DAPS-based handover, in accordance with the present disclosure. The DAPS-based handover may involve a UE, a source MCG (or source base station), a target MCG (or target base station), and a user plane function.

The DAPS-based handover may reduce a handover interruption time by enabling the UE to simultaneously connect to both the source MCG and the target MCG during the DAPS-based handover. The DAPS-based handover may be applicable to an intra-frequency handover, an intra-band inter-frequency handover, and/or an inter-band inter-frequency handover.

As shown in FIG. 4, in a first action, a UE may perform radio resource management (RRM) reference signal measurements, where the RRM reference signal may be a synchronization signal block (SSB) or a channel state information reference signal (CSI-RS). In a second action, an event trigger may occur at the UE, and in a third action, the UE may transmit a measurement report to the source MCG. The measurement report may indicate the RRM reference signal measurements. In a fourth action, the source MCG may perform a DAPS-based handover decision based at least in part on the measurement report. In a fifth action, the source MCG may prepare the target MCG for the DAPS-based handover.

In a sixth action, the source MCG may transmit a radio resource control (RRC) reconfiguration message to the UE. The RRC reconfiguration message may indicate a handover command. In a seventh action, the UE may connect to the target MCG, and in an eighth action, the UE may transmit an RRC reconfiguration complete message to the target MCG. In a ninth action, the target MCG may perform a source MCG connection release decision, and in a tenth action, the source MCG and the target MCG may communicate a handover connection setup complete indication. In an eleventh action, the target MCG may transmit, to the UE, an instruction to release the source MCG, and in a twelfth action, the UE may release the source MCG based at least in part on the indication received from the target MCG. In a thirteenth action, the UE may transmit an RRC reconfiguration complete message to the target MCG. In a fourteenth action, UE context information may be released with the source MCG. In a fifteenth action, the UE may communicate data on the target MCG.

In this example of the DAPS-based handover, the UE may be connected to both the source MCG and the target MCG during the handover of the UE from the source MCG to the target MCG. For example, between action seven and action eleven, the UE may continue data transmissions and receptions on the source MCG, even though the UE may also be connected to the target MCG.

As indicated above, FIG. 4 is provided as an example. Other examples may differ from what is described with regard to FIG. 4.

For a DAPS-based handover that is not intra-frequency, a UE may transmit on a target cell (e.g., a target cell associated with a target MCG), and the UE may cancel a transmission to a source cell (e.g., a source cell associated with a source MCG). In other words, the UE may transmit only on the target cell and may cancel the transmission to the source cell. The UE may transmit on the target cell and cancel the transmission to the source cell based at least in part on UE transmissions on the target cell and the source cell being in overlapping time resources, the UE not indicating a capability for power sharing between the source MCG and the target MCG in the DAPS-based handover, and the UE indicates a support of uplink transmission cancellations associated with the DAPS-based handover.

For a DAPS-based handover that is intra-frequency, the UE may transmit on the target cell and cancel the transmission to the source cell based at least in part on UE transmissions on the target cell and the source cell being in overlapping time resources.

Figure 5:
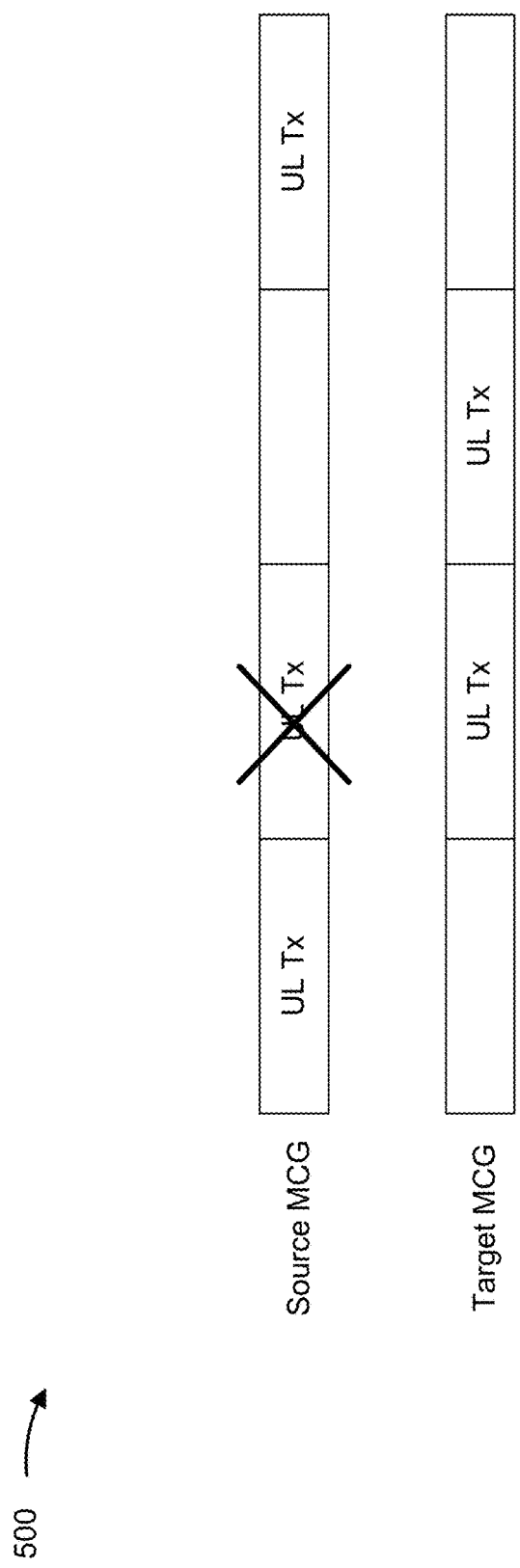
FIG. 5 is a diagram illustrating an example of an uplink cancellation in a DAPS-based handover, in accordance with the present disclosure.

FIG. 5 is a diagram illustrating an example 500 of an uplink cancellation in a DAPS-based handover, in accordance with the present disclosure.

As shown in FIG. 5, a UE may be connected to a source MCG and a target MCG during the DAPS-based handover. The UE may communicate with the source MCG based at least in part on a first slot configuration, and the UE may communicate with the target MCG based at least in part on a second slot configuration. In this example, the first slot configuration may be associated with a first slot that corresponds to an uplink transmission, a second slot that corresponds to an uplink transmission, a third slot that corresponds to a non-uplink transmission (e.g., a downlink transmission), and a fourth slot that corresponds to an uplink transmission. The second slot configuration may be associated with a first slot that corresponds to a non-uplink transmission, a second slot that corresponds to an uplink transmission, a third slot that corresponds to an uplink transmission, and a fourth slot that corresponds to a non-uplink transmission. In this example, since the second transmission associated with both the first slot configuration and the second slot configuration are uplink transmissions, the UE may cancel the second slot with the uplink transmission with respect to the source MCG. In other words, during the second slot associated with the first slot configuration and the second slot configuration, the UE may perform the uplink transmission to the target MCG and may cancel the uplink transmission to the source MCG.

As indicated above, FIG. 5 is provided as an example. Other examples may differ from what is described with regard to FIG. 5.

A UE may be handed over from a source MCG to a target MCG based at least in part on a DAPS-based handover. During the DAPS-based handover, the UE may communicate with both a source base station associated with the source MCG and a target base station associated with the target MCG. Regardless of whether the DAPS-based handover is an intra-frequency DAPS-based handover, the UE may perform a transmission on the target MCG and may cancel a transmission on the source MCG based at least in part on the transmission on the source MCG overlapping in time with the transmission on the target MCG. However, a UE behavior may not be defined for a situation in which a PUSCH transmission with repetition on the source MCG is canceled based at least in part on an uplink transmission on the target MCG when DAPS-based handover is enabled for the UE.

In various aspects of techniques and apparatuses described herein, a UE may transmit, to a source base station associated with a source MCG, a PUSCH repetition in each of one or more slots of the source MCG during a DAPS-based handover of the UE from the source MCG to a target MCG. The UE may perform, to a target base station associated with the target MCG, an uplink transmission in one or more slots to the target MCG during the DAPS-based handover. In some aspects, the UE may cancel PUSCH repetitions associated with the source MCG that overlap in time with the uplink transmission to MCG. In some aspects, the UE may count the PUSCH repetitions based at least in part on slots of the source MCG associated with canceled PUSCH repetitions. In some aspects, the UE may count the PUSCH repetitions based at least in part on counting the slots of the source MCG associated with the canceled PUSCH repetitions. In some aspects, the UE may count the PUSCH repetitions based at least in part on not counting the slots of the source MCG associated with the canceled PUSCH repetitions.

Figure 6:
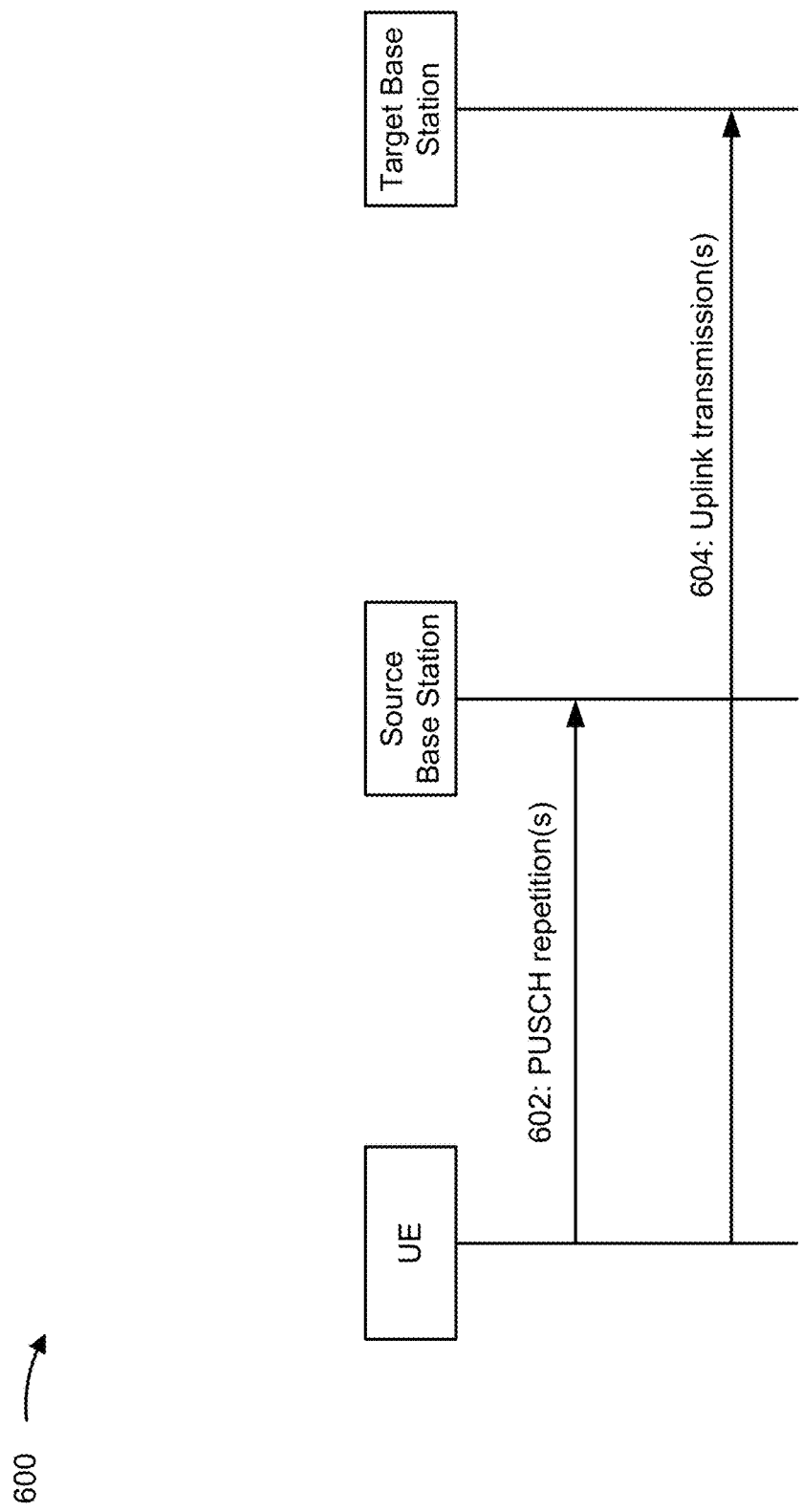

FIG. 6 is a diagram illustrating an example 600 of PUSCH repetitions during handover, in accordance with the present disclosure. As shown in FIG. 6, example 600 includes communication between a UE (e.g., UE 120), a source base station UE (e.g., base station 110a), and a target base station (e.g., base station 110b). In some aspects, the UE, the source base station, and the target base station may be included in a wireless network such as wireless network 100.

As shown by reference number 602, the UE may transmit, to the source base station associated with a source MCG, a PUSCH repetition in each of one or more slots of the source MCG. The one or more slots may be uplink slots and/or special slots. The UE may transmit PUSCH repetitions in the one or more slots of the source MCG during a DAPS-based handover of the UE from the source MCG to a target MCG. In some aspects, the PUSCH repetitions may be associated with a PUSCH repetition Type A, in which a same symbol allocation is applied in each of the one or more slots of the source MCG.

In some aspects, the UE may receive, from the source base station, a configuration associated with a quantity of PUSCH repetitions. The UE may transmit, to the source base station, the PUSCH repetitions in the one or more slots of the source MCG based at least in part on the configuration.

In some aspects, the DAPS-based handover may be associated with an FDD-to-FDD handover. In some aspects, the DAPS-based handover may be associated with a TDD-to-TDD handover. In some aspects, the DAPS-based handover may be associated with a TDD-to-FDD handover. In some aspects, the DAPS-based handover may be associated with an FDD-to-TDD handover. Further, FDD may be associated with a paired spectrum and TDD may be associated with an unpaired spectrum.

As shown by reference number 604, the UE may perform, to the target base station associated with the target MCG, an uplink transmission in one or more slots to the target MCG during the DAPS-based handover. The uplink transmission may be a physical uplink control channel (PUCCH) transmission, a PUSCH transmission, a sounding reference signal (SRS), a physical random access channel (PRACH) transmission, or a message 3 (Msg3) PUSCH transmission.

In some aspects, the UE may cancel PUSCH repetitions associated with the source MCG that overlap in time with the uplink transmission to MCG, where the one or more slots of the target MCG may be associated with the uplink transmission from the UE. In some aspects, the UE may cancel the PUSCH repetitions associated with the source MCG based at least in part on a lack of UE capability for power sharing between the source MCG and the target MCG during the DAPS-based handover. In some aspects, the UE may cancel the PUSCH repetitions associated with the source MCG based at least in part on a UE capability of canceling uplink transmissions during the DAPS-based handover.

In some aspects, the UE may count the PUSCH repetitions based at least in part on slots of the source MCG associated with canceled PUSCH repetitions. In one example, the UE may count the PUSCH repetitions based at least in part on counting the slots of the source MCG associated with the canceled PUSCH repetitions. In another example, the UE may count the PUSCH repetitions based at least in part on not counting the slots of the source MCG associated with the canceled PUSCH repetitions.

In some aspects, the PUSCH repetitions associated with the source MCG may fully overlap in time with the uplink transmission to MCG. In some aspects, the PUSCH repetitions associated with the source MCG may partially overlap in time with the uplink transmission to MCG.

In some aspects, when the UE may transmit a PUSCH repetition over a quantity of $N_{PUSCH}^{repeat}$ slots available for PUSCH repetition transmissions in the source MCG, and the UE does not transmit a PUSCH repetition in a slot included in the quantity of $N_{PUSCH}^{repeat}$ slots due to the slot overlapping in time with an uplink transmission to the target MCG, the UE may or may not count the slot included in the quantity of $N_{PUSCH}^{repeat}$ slots. The slot in the quantity of $N_{PUSCH}^{repeat}$ slots may be the slot associated with a canceled PUSCH repetition due to the slot overlapping in time with the uplink transmission to the target MCG. In this example, $N_{PUSCH}^{repeat}$ may represent a slot (e.g., an uplink slot or a special slot) associated with a PUSCH repetition. The uplink transmission to the target MCG may be associated with a PUCCH, a PUSCH, an SRS, a PRACH, or a Msg3 PUSCH.

As indicated above, FIG. 6 is provided as an example. Other examples may differ from what is described with regard to FIG. 6.

FIG. 7 is a diagram illustrating an example 700 of PUSCH repetitions during handover, in accordance with the present disclosure.

As shown in FIG. 7, a plurality of slots may be configured for PUSCH repetition transmissions to a source MCG, and a plurality of slots may be configured for uplink transmissions (e.g., PUCCH transmissions, PUSCH transmissions, SRS transmissions, PRACH transmissions, and/or Msg3 PUSCH transmissions) to a target MCG. A UE may perform PUSCH repetition transmissions to the source MCG on one or more slots associated with the source MCG, and the UE may perform uplink transmissions to the target MCG on one or more slots associated with the target MCG. However, for slots associated with the source MCG that overlap in time with uplink transmissions in slots associated with the target MCG, the UE may cancel PUSCH repetition transmissions in those slots associated with the source MCG. In other words, the UE may cancel the PUSCH repetition transmissions in those slots and instead may perform the uplink transmissions to the target MCG.

A slot format configuration (e.g., a configuration of uplink slots, downlink slots, and special slots) may be defined for the source MCG and a slot format configuration may be defined for the target MCG. In an FDD-to-FDD handover, in a first counting scheme in which the UE counts slot(s) of the source MCG that are associated with canceled PUSCH repetition transmissions due to uplink transmissions to the target MCG that overlap in time resources, the UE may associate a first slot with a first PUSCH repetition transmission with a count value of 0, and each subsequent slot may be associated with a count value that is incremented by one, irrespective of whether a subsequent slot is associated with a canceled PUSCH repetition transmission. In a second counting scheme in which the UE does not count slot(s) of the source MCG that are associated with canceled PUSCH repetition transmissions due to uplink transmissions to the target MCG that overlap in time resources, the UE may associate a first slot with a first PUSCH repetition transmission with a count value of 0, and each subsequent slot that is associated with a PUSCH repetition transmission (e.g., not a canceled PUSCH repetition transmission) may be associated with a count value that is incremented by one.

As an example, in the second counting scheme, slots 5 and 6 may not be counted since the PUSCH repetition transmission to the source MCG is canceled based at least in part on the uplink transmission to the target MCG.

As indicated above, FIG. 7 is provided as an example. Other examples may differ from what is described with regard to FIG. 7.

Figure 8:
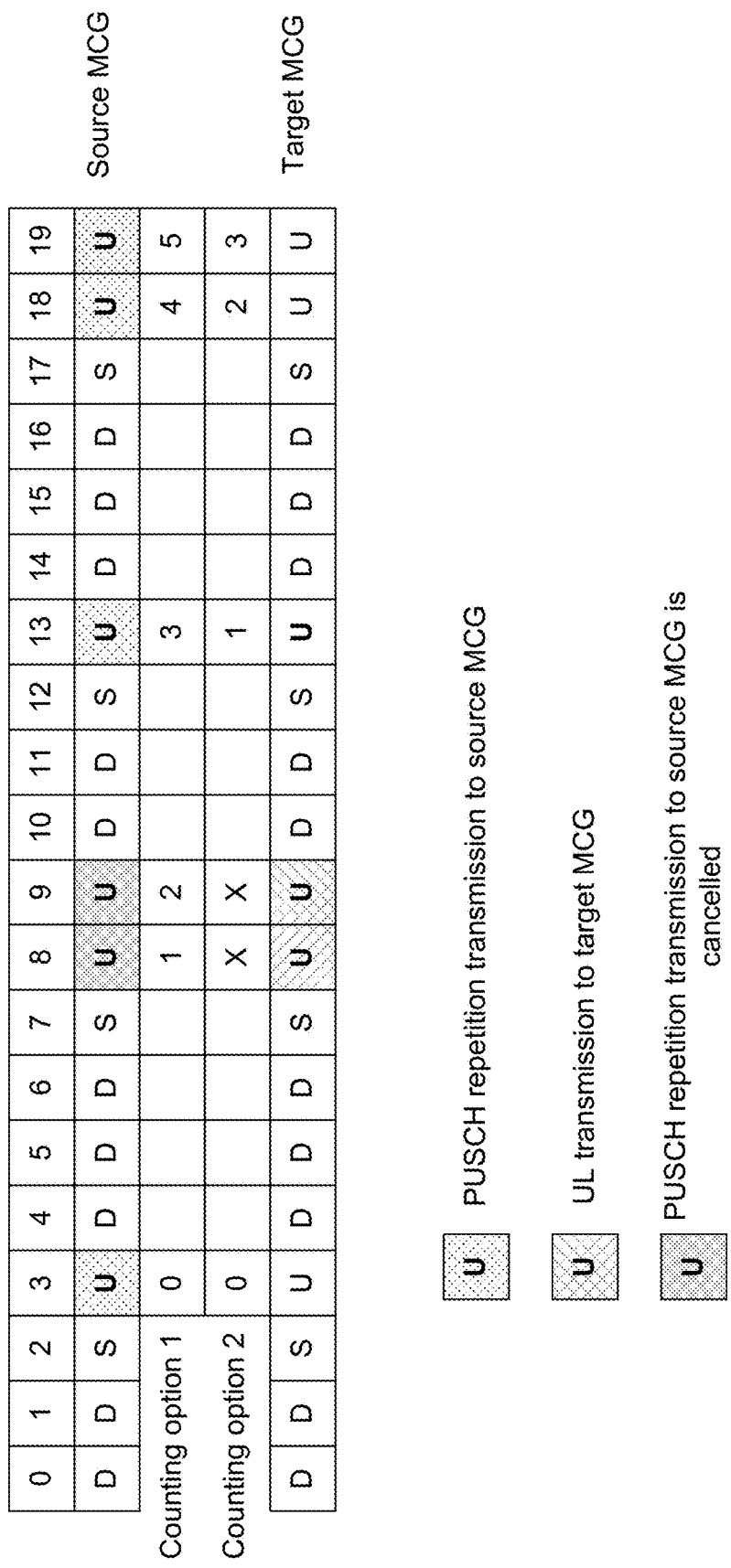

FIG. 8 is a diagram illustrating an example 800 of PUSCH repetitions during handover, in accordance with the present disclosure.

As shown in FIG. 8, a slot format configuration (e.g., a configuration of uplink slots, downlink slots, and special slots) may be defined for the source MCG and a slot format configuration may be defined for the target MCG. In a TDD-to-TDD handover, in a first counting scheme in which the UE counts slot(s) of the source MCG that are associated with canceled PUSCH repetition transmissions due to uplink transmissions to the target MCG that overlap in time resources, the UE may associate a first slot with a first PUSCH repetition transmission with a count value of 0, and each subsequent slot may be associated with a count value that is incremented by one, irrespective of whether a subsequent slot is associated with a canceled PUSCH repetition transmission. In a second counting scheme in which the UE does not count slot(s) of the source MCG that are associated with canceled PUSCH repetition transmissions due to uplink transmissions to the target MCG that overlap in time resources, the UE may associate a first slot with a first PUSCH repetition transmission with a count value of 0, and each subsequent slot that is associated with a PUSCH repetition transmission (e.g., not a canceled PUSCH repetition transmission) may be associated with a count value that is incremented by one.

As indicated above, FIG. 8 is provided as an example. Other examples may differ from what is described with regard to FIG. 8.

FIG. 9 is a diagram illustrating an example 900 of PUSCH repetitions during handover, in accordance with the present disclosure.

As shown in FIG. 9, a slot format configuration (e.g., a configuration of uplink slots, downlink slots, and special slots) may be defined for the source MCG and a slot format configuration may be defined for the target MCG. In a TDD-to-TDD handover, in a first counting scheme in which the UE counts slot(s) of the source MCG that are associated with canceled PUSCH repetition transmissions due to uplink transmissions to the target MCG that overlap in time resources, the UE may associate a first slot with a first PUSCH repetition transmission with a count value of 0, and each subsequent slot may be associated with a count value that is incremented by one, irrespective of whether a subsequent slot is associated with a canceled PUSCH repetition transmission. In a second counting scheme in which the UE does not count slot(s) of the source MCG that are associated with canceled PUSCH repetition transmissions due to uplink transmissions to the target MCG that overlap in time resources, the UE may associate a first slot with a first PUSCH repetition transmission with a count value of 0, and each subsequent slot that is associated with a PUSCH repetition transmission (e.g., not a canceled PUSCH repetition transmission) may be associated with a count value that is incremented by one.

As indicated above, FIG. 9 is provided as an example. Other examples may differ from what is described with regard to FIG. 9.

FIG. 10 is a diagram illustrating an example 1000 of PUSCH repetitions during handover, in accordance with the present disclosure.

As shown in FIG. 10, a slot format configuration (e.g., a configuration of uplink slots, downlink slots, and special slots) may be defined for the source MCG and a slot format configuration may be defined for the target MCG. In a TDD-to-TDD handover, in a first counting scheme in which the UE counts slot(s) of the source MCG that are associated with canceled PUSCH repetition transmissions due to uplink transmissions to the target MCG that overlap in time resources, the UE may associate a first slot with a first PUSCH repetition transmission with a count value of 0, and each subsequent slot may be associated with a count value that is incremented by one, irrespective of whether a subsequent slot is associated with a canceled PUSCH repetition transmission. In a second counting scheme in which the UE does not count slot(s) of the source MCG that are associated with canceled PUSCH repetition transmissions due to uplink transmissions to the target MCG that overlap in time resources, the UE may associate a first slot with a first PUSCH repetition transmission with a count value of 0, and each subsequent slot that is associated with a PUSCH repetition transmission (e.g., not a canceled PUSCH repetition transmission) may be associated with a count value that is incremented by one.

As indicated above, FIG. 10 is provided as an example. Other examples may differ from what is described with regard to FIG. 10.

Figure 11:
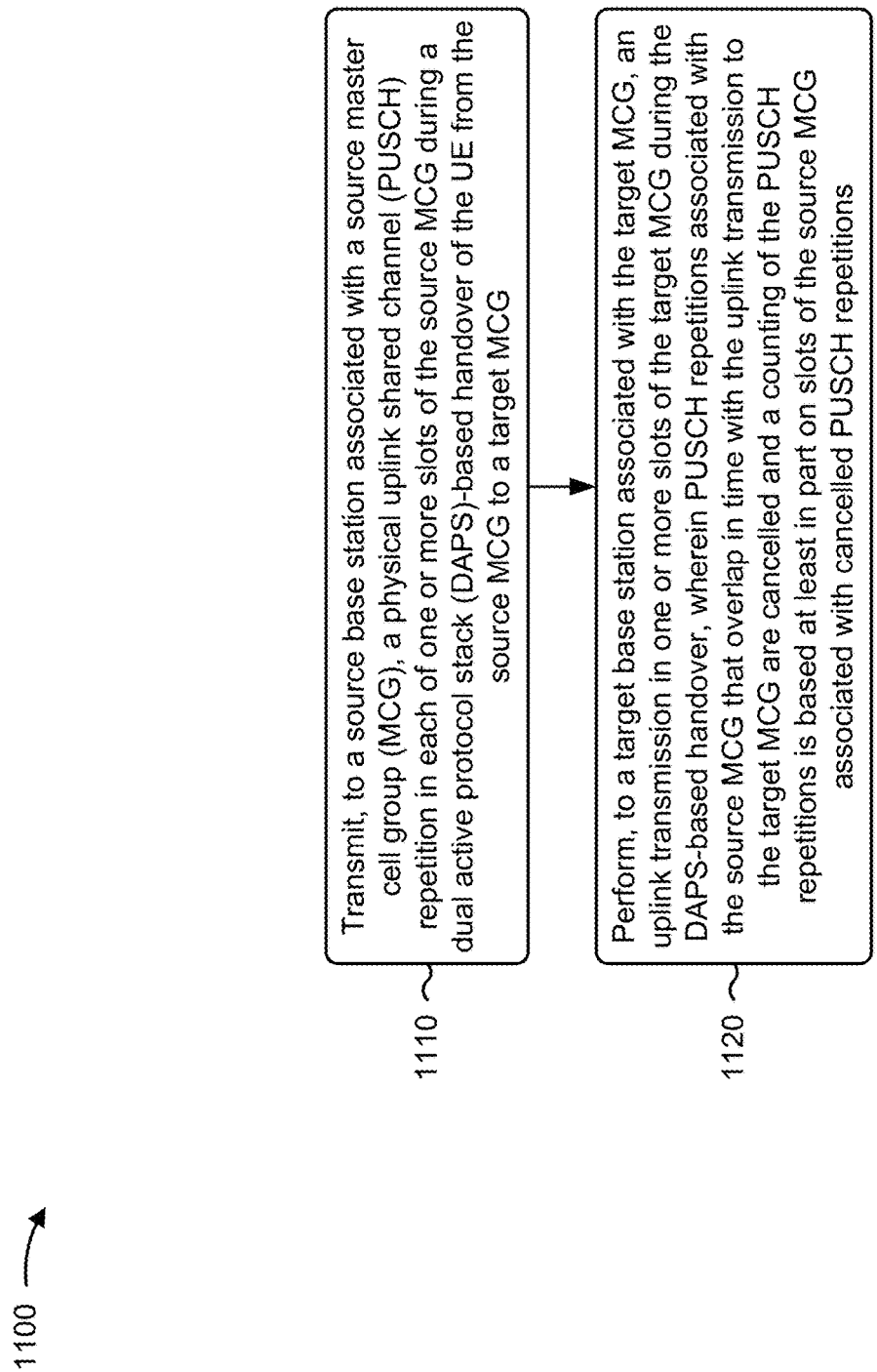
FIGS. 11-12 are diagrams illustrating example processes associated with PUSCH repetitions during handover, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with PUSCH repetitions during handover.

As shown in FIG. 11, in some aspects, process 1100 may include transmitting, to a source base station associated with a source MCG, a PUSCH repetition in each of one or more slots of the source MCG during a DAPS-based handover of the UE from the source MCG to a target MCG (block 1110). For example, the UE (e.g., using transmission component 1304, depicted in FIG. 13) may transmit, to a source base station associated with a source MCG, a PUSCH repetition in each of one or more slots of the source MCG during a DAPS-based handover of the UE from the source MCG to a target MCG, as described above.

As further shown in FIG. 11, in some aspects, process 1100 may include performing, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions (block 1120). For example, the UE (e.g., using transmission component 1304, depicted in FIG. 13) may perform, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions, as described above.

Process 1100 may include additional aspects, such as any single aspect or any combination of aspects described below and/or in connection with one or more other processes described elsewhere herein.

In a first aspect, the counting of the PUSCH repetitions includes counting the slots of the source MCG associated with the canceled PUSCH repetitions.

In a second aspect, alone or in combination with the first aspect, the counting of the PUSCH repetitions includes not counting the slots of the source MCG associated with the canceled PUSCH repetitions.

In a third aspect, alone or in combination with one or more of the first and second aspects, the PUSCH repetitions associated with the source MCG fully overlap in time with the uplink transmission to MCG.

In a fourth aspect, alone or in combination with one or more of the first through third aspects, the PUSCH repetitions associated with the source MCG partially overlap in time with the uplink transmission to MCG.

In a fifth aspect, alone or in combination with one or more of the first through fourth aspects, the uplink transmission in the one or more slots of the target MCG during the DAPS-based handover is one of a physical uplink control channel transmission, a PUSCH transmission, a sounding reference signal, a physical random access channel transmission, or a Msg3 PUSCH transmission.

In a sixth aspect, alone or in combination with one or more of the first through fifth aspects, the DAPS-based handover is associated with an FDD-to-FDD handover, a TDD-to-TDD handover, a TDD-to-FDD handover, or an FDD-to-TDD handover, wherein FDD is associated with a paired spectrum and TDD is associated with an unpaired spectrum.

In a seventh aspect, alone or in combination with one or more of the first through sixth aspects, the PUSCH repetitions are associated with a PUSCH repetition Type A, in which a same symbol allocation is applied in each of the one or more slots of the source MCG.

In an eighth aspect, alone or in combination with one or more of the first through seventh aspects, process 1100 includes canceling the PUSCH repetitions associated with the source MCG that overlap in time with the uplink transmission to MCG.

In a ninth aspect, alone or in combination with one or more of the first through eighth aspects, process 1100 includes canceling the PUSCH repetitions associated with the source MCG based at least in part on a lack of UE capability for power sharing between the source MCG and the target MCG during the DAPS-based handover.

In a tenth aspect, alone or in combination with one or more of the first through ninth aspects, process 1100 includes canceling the PUSCH repetitions associated with the source MCG based at least in part on a UE capability of canceling uplink transmissions during the DAPS-based handover.

In an eleventh aspect, alone or in combination with one or more of the first through tenth aspects, process 1100 includes canceling the PUSCH repetitions associated with the source MCG based at least in part on an intra-frequency DAPS-based handover.

In a twelfth aspect, alone or in combination with one or more of the first through eleventh aspects, the one or more slots of the source MCG include one or more of uplink slots or special slots; and the one or more slots of the target MCG include one or more of uplink slots or special slots.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
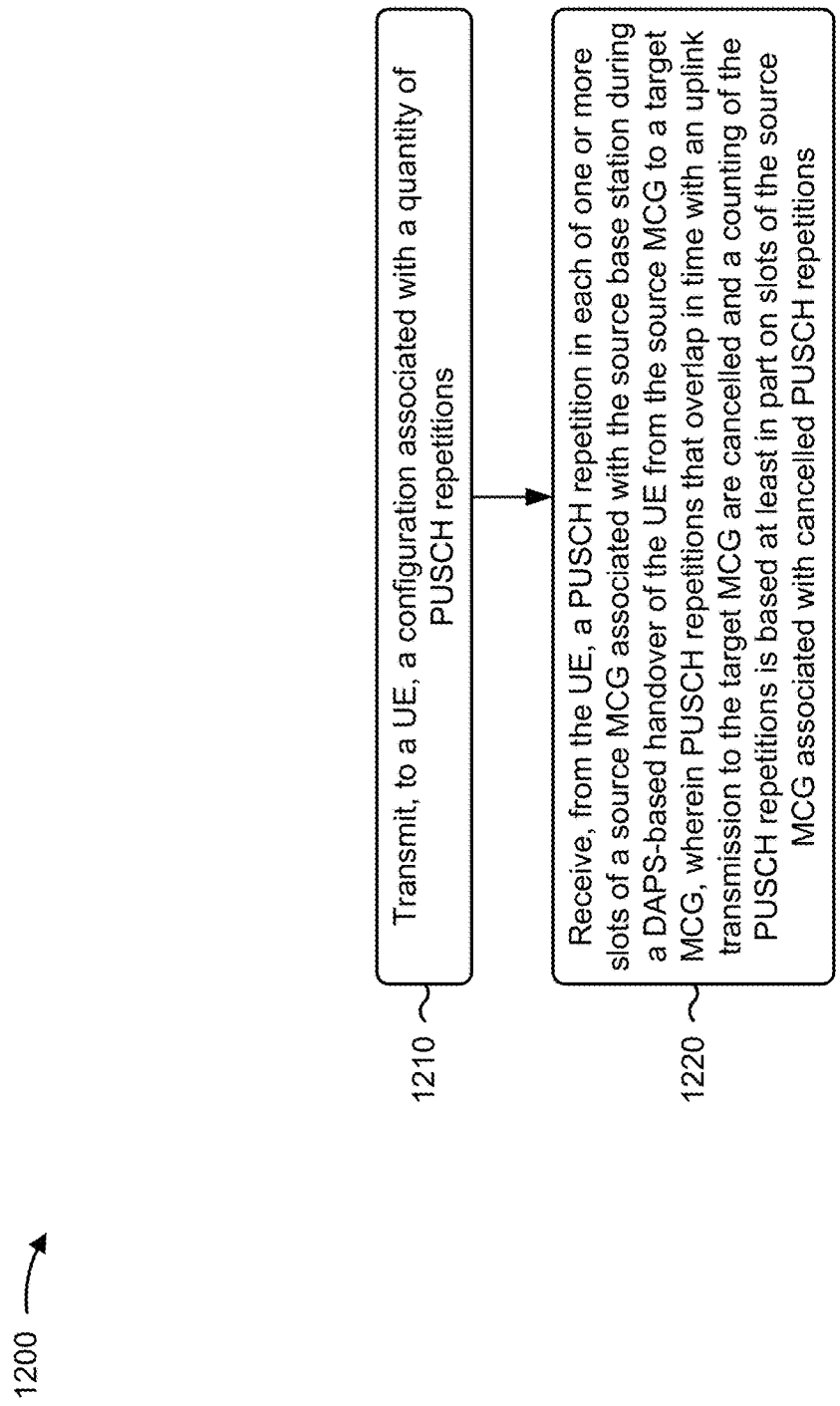

FIG. 12 is a diagram illustrating an example process 1200 performed, for example, by a source base station, in accordance with the present disclosure. Example process 1200 is an example where the source base station (e.g., source base station 110) performs operations associated with PUSCH repetitions during handover.

As shown in FIG. 12, in some aspects, process 1200 may include transmitting, to a UE, a configuration associated with a quantity of PUSCH repetitions (block 1210). For example, the source base station (e.g., using transmission component 1404, depicted in FIG. 14) may transmit, to a UE, a configuration associated with a quantity of PUSCH repetitions, as described above.

As further shown in FIG. 12, in some aspects, process 1200 may include receiving, from the UE, a PUSCH repetition in each of one or more slots of a source MCG associated with the source base station during a DAPS-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions (block 1220). For example, the source base station (e.g., using reception component 1402, depicted in FIG. 14) may receive, from the UE, a PUSCH repetition in each of one or more slots of a source MCG associated with the source base station during a DAPS-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions, as described above.

Process 1200 may include additional aspects, such as any single aspect or any combination of aspects described below and/or in connection with one or more other processes described elsewhere herein.

In a first aspect, the counting of the PUSCH repetitions is based at least in part on counting the slots of the source MCG associated with the canceled PUSCH repetitions.

In a second aspect, alone or in combination with the first aspect, the counting of the PUSCH repetitions is based at least in part on not counting the slots of the source MCG associated with the canceled PUSCH repetitions.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
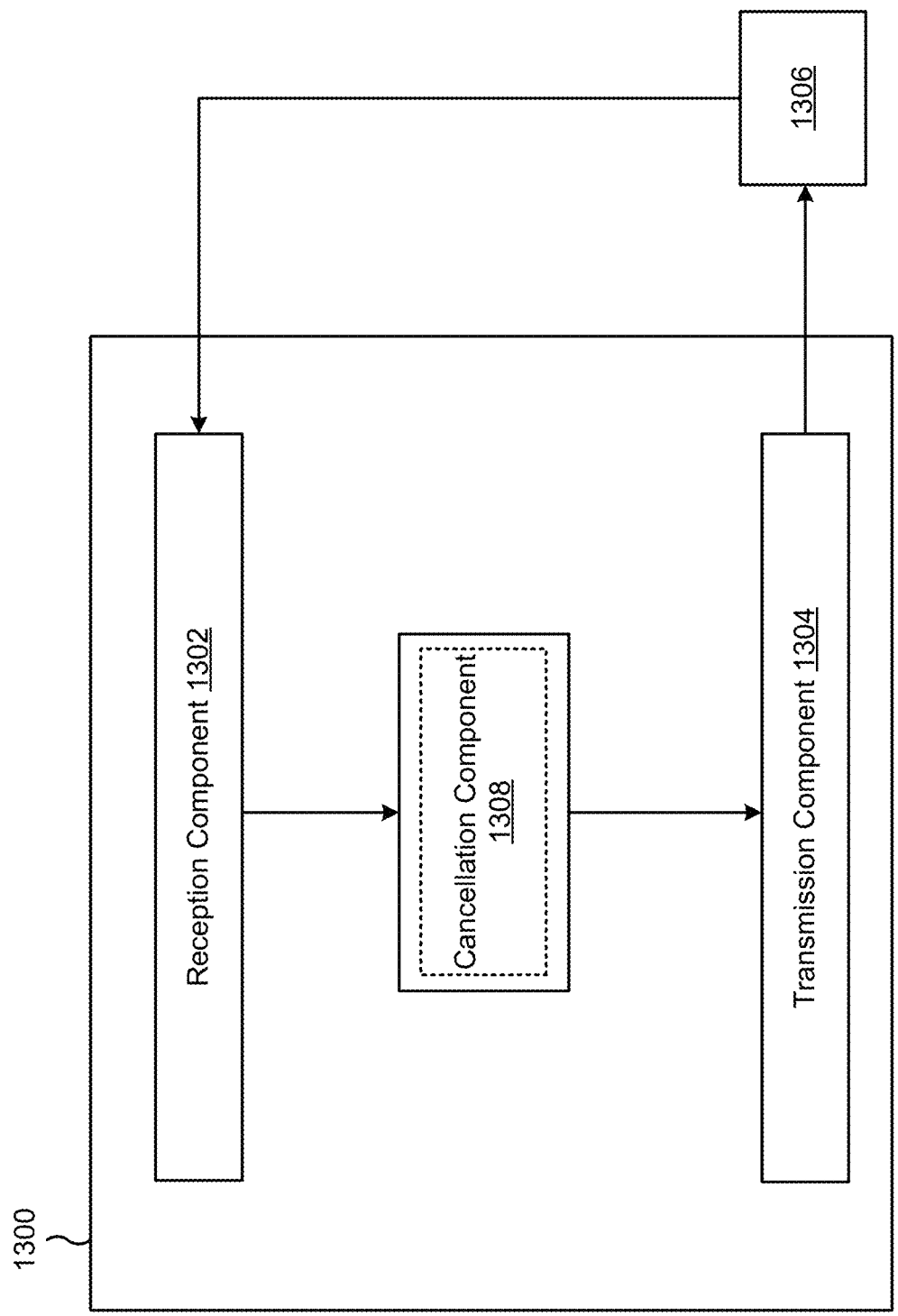
FIGS. 13-14 are block diagrams of example apparatuses for wireless communication, in accordance with the present disclosure.

FIG. 13 is a block diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include a cancellation component 1308, among other examples.

In some aspects, the apparatus 1300 may be configured to perform one or more operations described herein in connection with FIGS. 6-10. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the UE described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the UE described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the UE described above in connection with FIG. 2. In some aspects, the transmission component 1304 may be co-located with the reception component 1302 in a transceiver.

The transmission component 1304 may transmit, to a source base station associated with a source MCG, a PUSCH repetition in each of one or more slots of the source MCG during a DAPS-based handover of the UE from the source MCG to a target MCG. The transmission component 1304 may perform, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions.

The cancellation component 1308 may cancel the PUSCH repetitions associated with the source MCG that overlap in time with the uplink transmission to MCG. The cancellation component 1308 may cancel the PUSCH repetitions associated with the source MCG based at least in part on a lack of UE capability for power sharing between the source MCG and the target MCG during the DAPS-based handover. The cancellation component 1308 may cancel the PUSCH repetitions associated with the source MCG based at least in part on a UE capability of canceling uplink transmissions during the DAPS-based handover. The cancellation component 1308 may cancel the PUSCH repetitions associated with the source MCG based at least in part on an intra-frequency DAPS-based handover.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
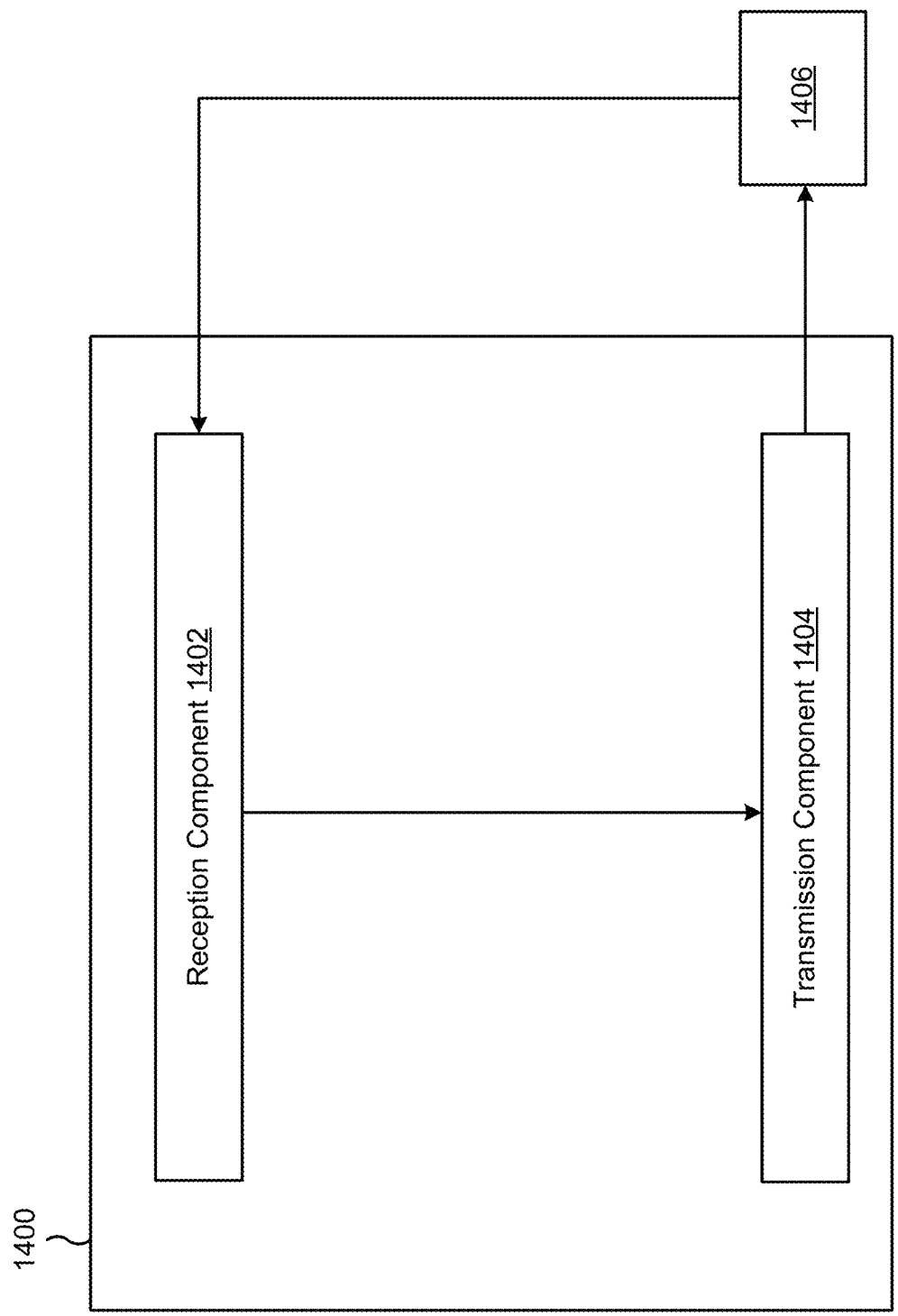

FIG. 14 is a block diagram of an example apparatus 1400 for wireless communication. The apparatus 1400 may be a source base station, or a source base station may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404.

In some aspects, the apparatus 1400 may be configured to perform one or more operations described herein in connection with FIGS. 6-10. Additionally, or alternatively, the apparatus 1400 may be configured to perform one or more processes described herein, such as process 1200 of FIG. 12. In some aspects, the apparatus 1400 and/or one or more components shown in FIG. 14 may include one or more components of the source base station described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the source base station described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the source base station described above in connection with FIG. 2. In some aspects, the transmission component 1404 may be co-located with the reception component 1402 in a transceiver.

The transmission component 1404 may transmit, to a UE, a configuration associated with a quantity of PUSCH repetitions. The reception component 1402 may receive, from the UE, a PUSCH repetition in each of one or more slots of a source MCG associated with the source base station during a DAPS-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: transmitting, to a source base station associated with a source master cell group (MCG), a physical uplink shared channel (PUSCH) repetition in each of one or more slots of the source MCG during a dual active protocol stack (DAPS)-based handover of the UE from the source MCG to a target MCG; and performing, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions.

Aspect 2: The method of Aspect 1, wherein the counting of the PUSCH repetitions includes counting the slots of the source MCG associated with the canceled PUSCH repetitions.

Aspect 3: The method of any of Aspects 1 through 2, wherein the counting of the PUSCH repetitions includes not counting the slots of the source MCG associated with the canceled PUSCH repetitions.

Aspect 4: The method of any of Aspects 1 through 3, wherein the PUSCH repetitions associated with the source MCG fully overlap in time with the uplink transmission to MCG.

Aspect 5: The method of any of Aspects 1 through 4, wherein the PUSCH repetitions associated with the source MCG partially overlap in time with the uplink transmission to MCG.

Aspect 6: The method of any of Aspects 1 through 5, wherein the uplink transmission in the one or more slots of the target MCG during the DAPS-based handover is one of: a physical uplink control channel transmission, a PUSCH transmission, a sounding reference signal, a physical random access channel transmission, or a message 3 (Msg3) PUSCH transmission.

Aspect 7: The method of any of Aspects 1 through 6, wherein the DAPS-based handover is associated with a frequency division duplexing (FDD)-to-FDD handover, a time division duplexing (TDD)-to-TDD handover, a TDD-to-FDD handover, or an FDD-to-TDD handover, wherein FDD is associated with a paired spectrum and TDD is associated with an unpaired spectrum.

Aspect 8: The method of any of Aspects 1 through 7, wherein the PUSCH repetitions are associated with a PUSCH repetition Type A, in which a same symbol allocation is applied in each of the one or more slots of the source MCG.

Aspect 9: The method of any of Aspects 1 through 8, further comprising: canceling the PUSCH repetitions associated with the source MCG that overlap in time with the uplink transmission to MCG.

Aspect 10: The method of any of Aspects 1 through 9, further comprising: canceling the PUSCH repetitions associated with the source MCG based at least in part on a lack of UE capability for power sharing between the source MCG and the target MCG during the DAPS-based handover.

Aspect 11: The method of any of Aspects 1 through 10, further comprising: canceling the PUSCH repetitions associated with the source MCG based at least in part on a UE capability of canceling uplink transmissions during the DAPS-based handover.

Aspect 12: The method of any of Aspects 1 through 11, further comprising: canceling the PUSCH repetitions associated with the source MCG based at least in part on an intra-frequency DAPS-based handover.

Aspect 13: The method of any of Aspects 1 through 12, wherein: the one or more slots of the source MCG include one or more of uplink slots or special slots; and the one or more slots of the target MCG include one or more of uplink slots or special slots.

Aspect 14: A method of wireless communication performed by a source base station, comprising: transmitting, to a user equipment (UE), a configuration associated with a quantity of physical uplink shared channel (PUSCH) repetitions; and receiving, from the UE, a PUSCH repetition in each of one or more slots of a source master cell group (MCG) associated with the source base station during a dual active protocol stack (DAPS)-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions.

Aspect 15: The method of Aspect 14, wherein the counting of the PUSCH repetitions is based at least in part on counting the slots of the source MCG associated with the canceled PUSCH repetitions.

Aspect 16: The method of any of Aspects 14 through 15, wherein the counting of the PUSCH repetitions is based at least in part on not counting the slots of the source MCG associated with the canceled PUSCH repetitions.

Aspect 17: An apparatus for wireless communication at a device, comprising a processor; memory coupled with the processor; and instructions stored in the memory and executable by the processor to cause the apparatus to perform the method of one or more Aspects of Aspects 1-13.

Aspect 18: A device for wireless communication, comprising a memory and one or more processors coupled to the memory, the memory and the one or more processors configured to perform the method of one or more Aspects of Aspects 1-13.

Aspect 19: An apparatus for wireless communication, comprising at least one means for performing the method of one or more Aspects of Aspects 1-13.

Aspect 20: A non-transitory computer-readable medium storing code for wireless communication, the code comprising instructions executable by a processor to perform the method of one or more Aspects of Aspects 1-13.

Aspect 21: A non-transitory computer-readable medium storing a set of instructions for wireless communication, the set of instructions comprising one or more instructions that, when executed by one or more processors of a device, cause the device to perform the method of one or more Aspects of Aspects 1-13.

Aspect 22: An apparatus for wireless communication at a device, comprising a processor; memory coupled with the processor; and instructions stored in the memory and executable by the processor to cause the apparatus to perform the method of one or more Aspects of Aspects 14-16.

Aspect 23: A device for wireless communication, comprising a memory and one or more processors coupled to the memory, the memory and the one or more processors configured to perform the method of one or more Aspects of Aspects 14-16.

Aspect 24: An apparatus for wireless communication, comprising at least one means for performing the method of one or more Aspects of Aspects 14-16.

Aspect 25: A non-transitory computer-readable medium storing code for wireless communication, the code comprising instructions executable by a processor to perform the method of one or more Aspects of Aspects 14-16.

Aspect 26: A non-transitory computer-readable medium storing a set of instructions for wireless communication, the set of instructions comprising one or more instructions that, when executed by one or more processors of a device, cause the device to perform the method of one or more Aspects of Aspects 14-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   transmitting, to a source base station associated with a source master cell group (MCG), a physical uplink shared channel (PUSCH) repetition in each of one or more slots of the source MCG during a dual active protocol stack (DAPS)-based handover of the UE from the source MCG to a target MCG; and
   performing, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions.

2. The method of claim 1, wherein the counting of the PUSCH repetitions includes counting the slots of the source MCG associated with the canceled PUSCH repetitions.

3. The method of claim 1, wherein the counting of the PUSCH repetitions includes not counting the slots of the source MCG associated with the canceled PUSCH repetitions.

4. The method of claim 1, wherein the PUSCH repetitions associated with the source MCG fully overlap in time with the uplink transmission to MCG.

5. The method of claim 1, wherein the PUSCH repetitions associated with the source MCG partially overlap in time with the uplink transmission to MCG.

6. The method of claim 1, wherein the uplink transmission in the one or more slots of the target MCG during the DAPS-based handover is one of: a physical uplink control channel transmission, a PUSCH transmission, a sounding reference signal, a physical random access channel transmission, or a message 3 (Msg3) PUSCH transmission.

7. The method of claim 1, wherein the DAPS-based handover is associated with a frequency division duplexing (FDD)-to-FDD handover, a time division duplexing (TDD)-to-TDD handover, a TDD-to-FDD handover, or an FDD-to-TDD handover, wherein FDD is associated with a paired spectrum and TDD is associated with an unpaired spectrum.

8. The method of claim 1, wherein the PUSCH repetitions are associated with a PUSCH repetition Type A, in which a same symbol allocation is applied in each of the one or more slots of the source MCG.

9. The method of claim 1, further comprising:
   canceling the PUSCH repetitions associated with the source MCG that overlap in time with the uplink transmission to MCG.

10. The method of claim 1, further comprising:
    canceling the PUSCH repetitions associated with the source MCG based at least in part on a lack of UE capability for power sharing between the source MCG and the target MCG during the DAPS-based handover.

11. The method of claim 1, further comprising:
canceling the PUSCH repetitions associated with the source MCG based at least in part on a UE capability of canceling uplink transmissions during the DAPS-based handover.

12. The method of claim 1, further comprising:
canceling the PUSCH repetitions associated with the source MCG based at least in part on an intra-frequency DAPS-based handover.

13. The method of claim 1, wherein:
the one or more slots of the source MCG include one or more of uplink slots or special slots; and
the one or more slots of the target MCG include one or more of uplink slots or special slots.

14. A method of wireless communication performed by a source base station, comprising:
transmitting, to a user equipment (UE), a configuration associated with a quantity of physical uplink shared channel (PUSCH) repetitions; and
receiving, from the UE, a PUSCH repetition in each of one or more slots of a source master cell group (MCG) associated with the source base station during a dual active protocol stack (DAPS)-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions.

15. The method of claim 14, wherein the counting of the PUSCH repetitions is based at least in part on counting the slots of the source MCG associated with the canceled PUSCH repetitions.

16. The method of claim 14, wherein the counting of the PUSCH repetitions is based at least in part on not counting the slots of the source MCG associated with the canceled PUSCH repetitions.

17. A user equipment (UE) for wireless communication, comprising:
a memory; and
one or more processors, operatively coupled to the memory, configured to:
transmit, to a source base station associated with a source master cell group (MCG), a physical uplink shared channel (PUSCH) repetition in each of one or more slots of the source MCG during a dual active protocol stack (DAPS)-based handover of the UE from the source MCG to a target MCG; and
perform, to a target base station associated with the target MCG, an uplink transmission in one or more slots to the target MCG during the DAPS-based handover, wherein PUSCH repetitions associated with the source MCG that overlap in time with the uplink transmission to MCG are canceled and a counting of the PUSCH repetitions is based at least in part on slots of the source MCG associated with canceled PUSCH repetitions.

18. The UE of claim 17, wherein the counting of the PUSCH repetitions includes counting the slots of the source MCG associated with the canceled PUSCH repetitions.

19. The UE of claim 17, wherein the counting of the PUSCH repetitions includes not counting the slots of the source MCG associated with the canceled PUSCH repetitions.

20. The UE of claim 17, wherein the uplink transmission in the one or more slots of the target MCG during the DAPS-based handover is one of: a physical uplink control channel transmission, a PUSCH transmission, a sounding reference signal, a physical random access channel transmission, or a message 3 (Msg3) PUSCH transmission.

21. The UE of claim 17, wherein the DAPS-based handover is associated with a frequency division duplexing (FDD)-to-FDD handover, a time division duplexing (TDD)-to-TDD handover, a TDD-to-FDD handover, or an FDD-to-TDD handover, wherein FDD is associated with a paired spectrum and TDD is associated with an unpaired spectrum.

22. The UE of claim 17, wherein the PUSCH repetitions are associated with a PUSCH repetition Type A, in which a same symbol allocation is applied in each of the one or more slots of the source MCG.

23. The UE of claim 17, wherein the one or more processors are further configured to:
cancel the PUSCH repetitions associated with the source MCG that overlap in time with the uplink transmission to MCG.

24. The UE of claim 17, wherein the one or more processors are further configured to:
cancel the PUSCH repetitions associated with the source MCG based at least in part on a lack of UE capability for power sharing between the source MCG and the target MCG during the DAPS-based handover.

25. The UE of claim 17, wherein the one or more processors are further configured to:
cancel the PUSCH repetitions associated with the source MCG based at least in part on a UE capability of canceling uplink transmissions during the DAPS-based handover.

26. The UE of claim 17, wherein the one or more processors are further configured to:
cancel the PUSCH repetitions associated with the source MCG based at least in part on an intra-frequency DAPS-based handover.

27. The UE of claim 17, wherein:
the one or more slots of the source MCG include one or more of uplink slots or special slots; and
the one or more slots of the target MCG include one or more of uplink slots or special slots.

28. A source base station for wireless communication, comprising:
a memory; and
one or more processors, operatively coupled to the memory, configured to:
transmit, to a user equipment (UE), a configuration associated with a quantity of physical uplink shared channel (PUSCH) repetitions; and
receive, from the UE, a PUSCH repetition in each of one or more slots of a source master cell group (MCG) associated with the source base station during a dual active protocol stack (DAPS)-based handover of the UE from the source MCG to a target MCG, wherein PUSCH repetitions that overlap in time with an uplink transmission to the target MCG are canceled and a counting of the PUSCH repetitions is based at least in part on slots of the source MCG associated with canceled PUSCH repetitions.

29. The source base station of claim 28, wherein the counting of the PUSCH repetitions is based at least in part on counting the slots of the source MCG associated with the canceled PUSCH repetitions.

30. The source base station of claim 28, wherein the counting of the PUSCH repetitions is based at least in part on not counting the slots of the source MCG associated with the canceled PUSCH repetitions.

* * * * *